United States Patent [19]

Black

[11] Patent Number: 5,173,191

[45] Date of Patent: Dec. 22, 1992

[54] INTERFACIALLY POLYMERIZED MEMBRANES FOR THE REVERSE OSMOSIS SEPARATION OF ORGANIC SOLVENT SOLUTIONS

[75] Inventor: Laura E. Black, Sarnia, Canada

[73] Assignee: Exxon Research and Engineering Company, Florham Park, N.J.

[21] Appl. No.: 417,333

[22] Filed: Oct. 5, 1989

[51] Int. Cl.$^5$ .............................................. B01D 61/02
[52] U.S. Cl. ..................................... 210/654; 210/490
[58] Field of Search ............... 210/640, 641, 644, 652, 210/654, 500.36, 490, 500.38; 427/246, 245, 324; 585/818, 819; 55/68

[56] References Cited

U.S. PATENT DOCUMENTS

| | | | |
|---|---|---|---|
| 2,930,754 | 3/1960 | Stuckey | 210/23 |
| 2,947,687 | 8/1960 | Lee | 210/23 |
| 3,043,891 | 7/1962 | Stuckey | 260/674 |
| 3,773,848 | 11/1973 | Perry et al. | 260/681.5 |
| 3,951,815 | 4/1976 | Wrasidlo | 210/500 |
| 4,277,344 | 7/1981 | Cadotte | 210/654 |
| 4,368,112 | 1/1983 | Thompson et al. | 208/31 |
| 4,464,494 | 8/1984 | King et al. | 523/400 |
| 4,510,047 | 4/1985 | Thompson | 208/321 |
| 4,541,972 | 9/1985 | Wernick | 264/41 |
| 4,582,726 | 4/1986 | Shuey et al. | 427/208.8 |
| 4,617,126 | 10/1986 | Funk et al. | 210/651 |
| 4,626,468 | 12/1986 | Sundet | 428/315.5 |
| 4,678,555 | 7/1987 | Wernick | 208/36 |
| 4,690,765 | 9/1987 | Linder et al. | 210/654 |
| 4,690,766 | 9/1987 | Linder et al. | 210/654 |
| 4,943,475 | 7/1990 | Baker et al. | 427/342 X |
| 4,963,165 | 10/1990 | Blume et al. | 55/68 X |
| 4,982,051 | 1/1991 | Pasternak et al. | 585/818 |
| 4,985,138 | 1/1991 | Pasternak | 208/308 |

FOREIGN PATENT DOCUMENTS

| | | |
|---|---|---|
| 211633 | 2/1987 | European Pat. Off. . |
| 2191006 | 8/1987 | Japan . |
| 2247808 | 10/1987 | Japan . |

OTHER PUBLICATIONS

"In Situ-Formed Condensation Polymers For Reverse Osmosis Membranes: Second Phase" Dept of the Interior, Jul. 1974 Cadotte et al NTIS PB-234198.

"Continued Evaluation of In Situ Formed Condensation Polymers For Reverse Osmosis Membranes" Dept of the Interior, Apr. 1976, Cadotte et al. NTIS PB 253-193.

Primary Examiner—Frank Spear
Attorney, Agent, or Firm—Joseph J. Allocca

[57] ABSTRACT

Interfacially polymerized, crosslinked membranes on microporous, organic solvent resistant ultrafiltration membrane backing are useful for the separation of organic mixtures under reverse osmosis conditions. The membranes are prepared by depositing an aqueous (or conversely non-aqueous) solution of a first component on the microporous backing, draining off the excess quantity of this first solution and then applying a second component in the form of a non-aqueous (or conversely aqueous) solution. The two components interact and polymerize at the interface between the aqueous phase and the non-aqueous phase to produce a highly crosslinked thin polymer layer on the microporous ultrafiltration support backing layer.

26 Claims, No Drawings

INTERFACIALLY POLYMERIZED MEMBRANES FOR THE REVERSE OSMOSIS SEPARATION OF ORGANIC SOLVENT SOLUTIONS

BRIEF DESCRIPTION OF THE INVENTION

Interfacially polymerized, crosslinked membranes on microporous, organic solvent resistant ultrafiltration membrane backing are useful for the separation of organic solvents and organic solutes under reverse osmosis conditions. The membranes are prepared by depositing an aqueous (or conversely non-aqueous) solution of a first reactant component on the microporous backing support layer, draining off the excess quantity of this first solution and then applying a second reactant component in the form of a non-aqueous (or conversely aqueous) solution. The two components interact and polymerize at the interface between the aqueous phase and the non-aqueous phase to produce a highly crosslinked thin polymer layer on the micro porous ultrafiltration support backing layer.

In this invention the membranes are generally prepared by reacting multi-functional amino compounds dissolved in water with a second polyfunctional agent dissolved in organic solvents. The amino compounds can be aliphatic, alicyclic or aromatic. The polyfunctional agents that the amines are reacted with can include di- and tri-acid chlorides, acid anhydrides, aliphatic and aromatic diisocyanates, thioisocyanates, chloroformates and sulfonyl chlorides. Organic solvent resistant backings which can be used include nylon (e.g. nylon 66), cellulose, polyester, teflon, polypropylene and other insoluble polymers. These membranes are useful for separating mixtures of organic liquids under reverse osmosis conditions. They are particularly useful for separating aromatics extraction solvents (such as N-methyl pyrollidone, furfural, phenol etc.) from mixtures of same with oil or aromatic hydrocarbons in raffinate or extract solutions resulting from the solvent extraction process. Similarly solvents used to dewax hydrocarbon oils, such as ketones and mixtures of ketones and aromatic hydrocarbons (e.g. MEK, MIBK, MEK/MIBK, MEK/Toluene etc.) can be separated from mixtures of same with dewaxed oil or with wax using the interfacially polymerized membranes under reverse osmosis conditions.

BACKGROUND OF THE INVENTION

The separation of solutes from organic solvents is desirable in many processes. It would be useful to have a reverse osmosis membrane that was insoluble in all organic solvents, and showed a high rejection for various solutes. Such a membrane could be useful in purifying streams that would degrade or dissolve many other membranes.

Interfacially polymerized membranes were initially discovered in the 1970's for use in water desalination (see "In Situ-formed Condensation Polymers for Reverse Osmosis Membranes: Second Phase", North Star Research Institute, prepared for Department of the Interior, July 1974, available from NTIS, report #PB-234 198; "Continued Evaluation of In Situ-formed Condensation Polymers for Reverse Osmosis Membranes", Midwest Research Institute, prepared for Office of Water Research and Technology, April 1976, available from NTIS, report #PB-253 193; "Interfacially Synthesized Reverse Osmosis Membrane", U.S. Pat. No. 4,277,344, Jul. 7, 1981, assn. to Film Tec Corporation).

Prior art only describes the use of these membranes for the separation of aqueous solutions by reverse osmosis. There is no mention of the use of these membranes for the separation of solutes from organic solvents by reverse osmosis.

Interfacially polymerized membranes are composed of a highly crosslinked and generally insoluble condensation polymer which is formed in situ on a micro-porous film. Most of these membranes are formed with di- or polyamines which are reacted with multi-functional iso-cyanates or acid chlorides. Amines react very readily with both of these reactants. Several of these membranes have been commercialized for water desalination purposes by companies such as UOP, Film Tec and Desalination Systems Inc. All of the commercial membranes use a polysulfone ultrafiltration membrane (0.02 to 0.1 micron pore size) for the microporous support film. Prior art does describe the use of some other microporous support films such as polyvinylchloride ultrafiltration membranes but none of the support films mentioned are particularly resistant to organic solvents.

These membranes are formed using the following procedures. A thin layer of a dilute solution of one component, usually an aqueous solution of the amine, is put on one side of the microporous support film. A thin layer of a dilute solution of the second component, usually in a water immiscible solvent, is then put on top of the water solution layer. The order of applying the solutions can be reversed. The two components react at the water/solvent interface forming a thin (less than 1 micron thick) highly crosslinked polymer layer. This polymer layer is the active layer of the membrane at which separation occurs. Some examples of formulations mentioned in the prior art are reacting polyethylenimine with toluene diisocyanate, reacting polyethylenimine with isophthaloyl dichloride and reacting m-phenylene diamine with trimesoyl chloride.

These membranes exhibit high salt rejections from water (>95%). The commercially available membranes prepared on polysulfone ultrafiltration membranes are not suitable for separating solutes from organic solvents as these typically soften or dissolve polysulfone.

THE PRESENT INVENTION

It is an object of the present invention to prepare interfacially polymerized membranes on an organic solvent resistant ultrafiltration membrane and then to use these membranes for the reverse osmosis separation of solutes from organic solvents. It is not obvious that these membranes can be formed on such solvent resistant ultrafiltration membranes. For example, the prior art suggests that not all backings (even those with the correct range of pore sizes) can be successfully used. It is also not obvious that these membranes, which exhibit high salt rejections in aqueous solutions, would also exhibit high solute rejections in organic solutions.

The present invention describes, in particular, the use of these interfacially polymerized membranes on a solvent resistant backing, for the separation of aromatic extraction solvents such as N-methyl pyrollidone (NMP), phenol, sulfolane, furfural, N,N-dimethyl formamide (DMF), dimethyl sulfoxide (DMSO), and di-methyl-acetamide (DMAc), preferably NMP, phenol or furfural from oil. The solvent resistant backing is an ultrafiltration membrane with pore sizes in the range of 0.02 to 0.1 microns and is composed of generally insoluble polymers such as nylon 6,6, cellulose, polyester, teflon, polypropylene and other insoluble polymers, preferably nylon 6,6. It has been discovered that these membranes provide much higher fluxes and oil rejections in the separation of extraction solvents from oil than do commercially available regenerated cellulose membranes (see U.S. Pat. No. 4,510,047).

In the present invention the interfacially polymerized membranes are prepared by reacting multi-functional amino reactants dissolved in water with other polyfunctional agent reactants dissolved in organic solvents. The interfacially polymerized membrane is produced on a non-selective, microporous ultrafiltration support layer which is inert in the organic media to which it will be exposed. This support layer is selected from nylon, cellulose, polyester, teflon, polypropylene, polyethylene terephthalate etc. ultrafiltration membranes having pores in the range $0.02\mu$ to $0.1\mu$.

A few examples of multi-functional amino group reactants include polyethylenimine, polyvinylamine, polyvinylanilines, polybenzylamines, polyvinylimidazolines, amine modified polyepihalohydrins, and other amine containing polymers, m-phenylene diamine, p-phenylene diamine, triaminobenzene, piperazine, piperidine, 2,4-bis (p-aminobenzyl) aniline, cyclohexane diamine, cycloheptane diamine, etc. and mixtures thereof.

The polyfunctional agents that the amines are reacted with can include di- and tri-acid halides, e.g. chlorides, acid anhydrides, aliphatic and aromatic diisocyanates, thioisocyanates, haloformates (e.g. chloroformates) and sulfonyl halides, (e.g. sulfonyl chlorides), and mixtures thereof. A few examples of these agents are trimesoyl chloride, cyclohexane-1,3,5 tricarbonyl chloride, isophthaloyl chloride, terephthaloyl chloride, diisocyanatohexane, cyanuric chloride, diphenylether disulfonyl chloride, formyl chloride, acetyl chloride, propionyl chloride, butyryl chloride, valeryl chloride, caproyl chloride, heptanoyl chloride, valeryl chloride, caproyl chloride, heptanoyl chloride, octanoyl chloride, pelargonyl chloride, capryl chloride, lauryl chloride, myristyl chloride, palmityl chloride, margaryl chloride, stearyl chloride etc., oxalyl chloride, malonyl chloride, succinyl chloride, glutaryl chloride, fumaryl chloride, glutaconyl chloride, acetic anhydride, propionic anhydride, butyric anhydride, phthalic anhydride, ethylene diisocyanate, propylene diisocyanate, benzene diisocyanate, toluene diisocyanate, naphthalene diisocyanate, methylene bis (4-phenylisocyanate), ethylene thioisocyanate, toluene thioisocyanate, naphthalene thioisocyanate, ethylene bischloroformate, propylene bischloroformate, butylene bischloroformate, 1,3-benzenedisulfonyl chloride, 1,4 benzene disulfonyl chloride, 1,3-naphthalene disulfonyl chloride and 1,4-naphthalenedisulfonyl chloride, etc. and mixtures thereof.

A crosslinked membrane is used in the present invention to ensure stability in the organic solutions. A crosslinked polymeric film is formed if these membranes are prepared with one of the reagents being at least trifunctional. The degree of crosslinking is primarily controlled by the concentration of the reactant solution with higher concentrations leading to higher degrees of crosslinking. Membranes prepared from high concentration solutions generally show higher solute rejections when tested under reverse osmosis conditions.

In general the interfacially polymerized membranes are produced using 0.1 to 10 wt % aqueous solutions of the amines, preferably 0.25 to 5 wt % aqueous solutions of the amines; and 0.1 to 5 wt % non-aqueous solutions of the poly-functional agents, preferably 0.15 to 0.5 wt % non-aqueous solution of the poly-functional agent.

Following the sequential deposition of the two solutions, the resulting film can be heated to promote crosslinking of any unreacted amine. This post heating step can be at a temperature of about 60 to 150° C., preferably 80 to 120° C. for from 1 to 20 minutes. The concentrations of components used and drying/crosslinking times and temperatures selected from the above ranges will be selected by the practition in response to the membrane casting procedures actually employed and the casting machines or other mechanisms or equipment used.

The selective aromatics extraction solvents such as N-methyl-2-pyrrolidone (NMP), phenol, furfural, N,N-dimethylformamide (DMF), dimethylsulfoxide (DMSO) and dimethylacetamide (DMAC) used to extract aromatic hydrocarbons from hydrocarbon oils such as specialty oils or white oils are themselves recovered from the raffinate phase, extract phase or both resulting from such extraction by permeation under reverse osmosis conditions through the interfacially polymerized membranes. Reverse osmosis conditions include contacting the then, interfacially polymerized crosslinked face of the membrane with the raffinate phase, extract phase, or both, preferably extract phase at a temperature between about $-24$ to 200° C., preferably 40 to 150° C. and under an applied pressure sufficient to overcome the osmotic pressure. Pressures on the order of 0 to 1000 psig can be used, preferably about 400 to 600 psig.

The recovered aromatic extraction solvent is recycled to the beginning of the extraction process or introduced into the extraction zone somewhat downstream of the fresh solvent inlet at a point where the composition of the membrane recovered solvent matches the composition of the solvent/oil mixture in the extraction zone.

The separation process could employ the interfacially polymerized membrane in the form of a spiral wound element. Fabrication of a spiral wound element would employ adhesives as disclosed in U.S. Pat. Nos. 4,464,494 and 4,582,726, hereby incorporated by reference.

EXPERIMENTAL

EXAMPLE 1

A 50 wt % water solution of polyethylenimine was used as supplied from Aldrich (Aldrich cat #18, 197–8). A sample of diphenyl methane $-4,4$ diisocyanate (also referred to as methylene diisocyanate or MDI) was used as received from BASF Wyandotte Corporation. Ultipor nylon 66 membranes with $0.1\mu$ pore size were used as supplied by Pall Ultrafine Filtration Corporation.

The polyethylenimine (PEI) was further diluted with deionized water to prepare several solutions with various PEI concentrations ranging from 0.35 to 2.6 wt %. A toluene/hexane solution containing approximately 0.4 wt % MDI was prepared. Several membranes were prepared using the following procedure.

A disc of the nylon 6,6 membrane support was installed in a wash coat cell where one side of the membrane was left exposed. A polyethylenimine solution was poured over the exposed side of the membrane and was allowed to remain for 1 minute. The excess solution was then drained off the membrane for 1 minute. The MDI solution was then poured over the exposed side of the membrane and was allowed to remain for 1 minute and was then drained for 1 minute. The membrane was then placed in an oven (at temperatures > 100° C.) for 10 minutes. After this heat treatment, the resulting interfacially polymerized, crosslinked polyurea membrane was ready for testing.

The membrane performance was tested by circulating a sample of an extract oil solution (average molecular weight of oil=400 g/mole) containing 12 vol % oil in NMP over the thin interfacially polymerized crosslinked face of the membranes at 70° C. and at an applied feed pressure of 500 PSIG. The permeate yield was kept below 5% to ensure that the feed composition did not change during testing. The membranes were tested for 2 to 3 hours, during which time the membrane flux was recorded and permeate samples collected. The membranes were then left in the test unit overnight in the extract solution at ambient temperatures with no applied feed pressure. The next morning, the membranes were retested for an additional 2 to 3 hours with additional permeate samples being collected. The volume percent oil in both the feed and the permeate samples was measured.

The interfacially polymerized membranes had fluxes ranging from about 200 to 750 $1/m^2 day$ with corresponding oil rejections of 98 vol % to 88 vol % (Table 1). Both the concentration of the polyethylenimine in the water wash solution and the heat treatment temperature affected the membrane performance. The high oil rejection of >98% was obtained with the highest PEI concentration tested of 2.63%.

TABLE 1

EQUILIBRIUM PERFORMANCE OF INTERFACIALLY POLYMERIZED MEMBRANES*

| Temperature = | 70° C. |
| Pressure = | 500 psig |
| Feed = | 12 vol % 150N extract oil/NMP |
| Membrane: | prepared by reacting aqueous solution of polyethylenimine with 0.4 wt % methylene diisocyanate in toluene/hexane on a 0.1µ nylon 6,6 ultrafiltration membrane |

| Run No. | wt % PEI in Water | Heat Treatment Temperature °C. | Flux $1/m^2$ day | Oil Rejection(1) vol % |
|---|---|---|---|---|
| A | 2.63 | 135 | 210 | >98 |
| B | 2.63 | 145 | 196 | >98 |
| C | 0.67 | 145 | 750 | 88 |
| D | 0.67 | 112 | 330 | 94 |
| E | 0.35 | 112 | 477 | 96 |

*performance at end of the second test period after the membranes had soaked in the feed solution overnight
(1) oil rejection accurate to ±1.5 vol %

After the overnight soak period, the flux exhibited by the membranes increased by about 50 $1/m^2 day$ (Tables 2,3,4,5,6). The reason for this increase is not understood. The membrane rejection stayed essentially the same or increased in a couple of cases. The long term stability of these membranes is NMP solutions is not yet known.

EXAMPLE 2

A 50 wt % aqueous solution of polyethylenimine was used as supplied from Aldrich (Aldrich cat #18,197-8). Samples of diphenyl methane −4,4 diisocyanate (also referred to as methylene diisocyanate or MDI) and toluene diisocyanate were used as received from BASF. Isophthaloyl dichloride (IPDC), trimesoyl chloride, 1,3-phenylene diamine and 1,4-phenylene diamine (1,4-PDA) were used as supplied from Aldrich. Ultipor nylon 6,6 membranes with 0.04µ pore size were used as support membranes as supplied by Pall Ultrafine Filtration Corporation.

Membranes prepared by reacting polyethylenimine with methylene diisocyanate were made as follows. The PEI was diluted with deionized water to prepare several solutions with PEI concentrations ranging from 0.25 to 1.0 wt %. The MDI was dissolved in a 35/15 w/w toluene/hexane mixture to prepare several solutions with MDI concentrations ranging from 0.25 to 0.6 wt %. A disc of the nylon 6,6 membrane was installed in a wash coat cell where one side of the membrane was left exposed. A polyethylenimine solution was poured over the exposed side of the membrane and was allowed to remain for one minute. The excess solution was then drained off the membrane for one minute. The MDI solution was then poured over the same exposed side of the membrane and was allowed to remain for one minute and was then also drained for one minute. The membrane was then placed in an oven at 110° C. for 10 minutes. After this heat treatment, the membrane was ready for testing.

Membranes prepared by reacting polyethylenimine with toluene diisocyanate were made in the same manner as described above, except that TDI solutions in hexane with concentrations ranging from 0.25% to 0.5% were used. Similarly, membranes prepared by reacting polyethylenimine with isophthaloyl dichloride were made in the same manner except that IPDC solutions in hexane with concentrations ranging from 0.5% to 1.0% were used. Membranes prepared by reacting 1,4 phenylene diamine with trimesoyl chloride were made in the same manner using aqueous solutions of 1,4-PDA ranging in concentration from 1 to 4% and hexane solutions of TMC ranging in concentration from 0.15 to 0.5%. The PDA/TMC membranes were not heat treated. Similarly, interfacially polymerized, crosslinked polyamide membranes prepared by reacting 1,3-phenylene diamine with trimesoyl chloride were made in the same manner except that aqueous solutions of 1,3-PDA ranging in concentration from 1 to 4% were used.

Membrane performance was determined by circulating a sample of an extract oil solution (average molecular weight of oil=400 g/mole) containing 13 vol % oil in NMP over the membranes at 70° C. at an applied feed pressure of 500 PSIG. The permeate yield was kept below 5% to ensure that the feed composition did not change during testing. The membrane flux was recorded and permeate samples collected. The volume percent oil in both the feed and permeate samples was measured.

THE POLYETHYLENIMINE BASED MEMBRANES

For interfacial membranes prepared from polyethylenimine and methylene diisocyanate, fluxes ranging from 94 to 500 $\lambda/m^2 day$ and oil rejections ranging from 90 to 99 vol % (accurate to 1.5 vol %) were obtained (Table 2). The most important parameter controlling the performance of these membranes was the concentration of the aqueous PEI solution. The concentration of the MDI solution (over the ranges studied) had only a minor effect. As the PEI concentration increased from 0.25 to 1.0 wt %, the oil rejection increased from 92 to 99 vol % and the flux decreased from 500 to 94 $\lambda/m^2 day$ for membranes made with MDI concentrations of 0.5%. Increasing the MDI concentration from 0.25 to 0.6 wt % appeared to decrease the oil rejection slightly from 94 to 90% at low PEI concentrations but did not appear to have any effect at higher PEI concentrations. This slight decrease might not be a real effect as the rejection is only accurate to 1.5 vol %.

The effect of the MDI concentration on flux is not as clear. At high PEI concentrations, the MDI concentrations (within the range studied) appeared to have little effect. At lower PEI concentrations, the 0.5% MDI membranes appeared to have higher fluxes than membranes made with either lower or higher MDI concentrations. The optimum membrane for NMP/oil separations was prepared from solutions containing 0.25% PEI and 0.5% MDI which gave an oil rejection of 92 vol % and a flux of 500 $\lambda/m^2day$.

Interfacial membranes prepared from polyethylenimine and toluene diisocyanate showed similar trends. Oil rejections ranging from 90.8 to 99 vol % and fluxes ranging from 10 to 411 $\lambda/m^2day$ were obtained (Table 3). Again, the PEI concentration was the most important factor controlling membrane performance. The TDI concentration (over the range studied) did not have any significant effect. As the PEI concentration increased from 0.25 to 1.0%, the oil rejection increased from approximately 91 to 99 vol % and the flux declined from 300-400 down to 10-50 $\lambda/m^2day$.

In comparing membranes made with MDI and TDI, little difference can be observed for the oil rejection of membranes prepared using the same concentrations of reactants. Membranes prepared with MDI seem to show a slightly lower oil rejection (96 vol % vs 99 vol % at 0.5% PEI) but this is within the range of accuracy of these values. A major difference can be observed, however, for the fluxes exhibited by the membranes. Membranes made with MDI, in comparison to membranes made with TDI, at the same reactant concentrations, exhibit fluxes twice as high. For example, membranes prepared from a 0.25% PEI solution and a 0.5% MDI or TDI solution both gave an oil rejection of 92% but exhibited fluxes of 497 and 280 respectively. MDI is clearly preferred over TDI since it results in higher flux membranes.

Interfacially polymerized membranes were prepared by reacting polyethylenimine with isophthaloyl dichloride (Table 4). Surprisingly, these membranes exhibited low oil rejections of about 78 vol % with fluxes of 294 $\lambda/m^2day$. According to literature (J. Macrmol. Sci. - Chem A15 (5) pp 727-755, 1981) a membrane prepared by reacting 0.5% IPC in hexane with 0.67% PEI in water, exhibits a high salt rejection from water of 99.3%. From this it can be seen that there is no direct correlation between membrane salt rejection performance and membrane oil rejection performance.

Overall, the major factors controlling the flux and oil rejection exhibited by polyethylenimine based membranes are the identity of the isocyanate or acid chlorides and the solution concentration of the reactants. Membranes reacted with MDI show higher fluxes than do membranes reacted with TDI. The flux and rejection exhibited by a membrane prepared with a particular isocyanate is controlled primarily by the solution concentration of the imine, e.q. PEI. While high rejection membranes were not obtained using isophthaloyl dichloride instead of the isocyanates, the membranes produced did exhibit the ability to separate mixtures of organic solvents and solutes under reverse osmosis conditions.

THE PHENYLENE DIAMINE BASED MEMBRANES

The phenylene diamine based membranes are usually reacted with an acid chloride such as trimesoyl chloride.

For interfacial membranes prepared from 1,4 phenylene diamine and trimesoyl chloride, oil rejections ranging from 58.5 to 97 vol % and fluxes ranging from 1270 to 580 $\lambda/m^2day$ were obtained. (Table 5). For these membranes, both the concentration of 1,4 phenylene diamine in water and trimesoyl chloride in hexane were important in controlling their performance. As the concentration of TMC increased for a given PDA concentration, the oil rejection decreased and the flux increased. This effect was particularly noticeable at the lowest PDA concentration tested of 1%. At 4%, PDA, as the TMC concentration increased from 0.15 to 0.5%, the rejection decreased from approximately 96 to 90 vol % and the flux stayed relatively constant at close to 600 $\lambda/m^2day$. Higher concentrations of TMC might be expected to yield more highly crosslinked and hence higher rejection membranes.

The PDA concentration also had a strong impact on membrane performance. As expected, as the PDA concentration increased, the oil rejection increased and the flux decreased. The optimum membrane for NMP/oil separation was prepared from solutions containing 4% PDA and 0.15% TMC; this gave an oil rejection of 95 to 97 vol % with fluxes of 580 $\lambda/m^2day$. Slightly lower TMC and/or slightly higher PDA concentration might give a membrane with somewhat better performance. The optimum membrane shows both higher fluxes and oil rejections than the optimum PEI/MDI membrane which gave an oil rejection of 92 vol % at a flux of 500 $\lambda/m^2day$. Among the membranes tested, the 1,4 PDA/TMC membranes appear to be the optimum for the NMP/oil separation.

Surprisingly, for an interfacially polymerized membrane prepared from a 4% water solution of 1,3-phenylene diamine and a 0.15% hexane solution of trimesoyl chloride, an oil rejection of 70 vol % with a flux of 1050 $\lambda/m^2day$ was exhibited (Table 6). According to literature, (U.S. Pat. No. 4,277,344) these membranes exhibit salt rejections of over 99% from aqueous solutions. Again, it can be seen that there is no direct correlation between membrane salt rejection performance and membrane oil rejection performance.

The optimum interfacially polymerized membrane was prepared by reacting a 4% water solution of 1,4 phenylene diamine with a 0.15% solution of trimesoyl chloride in hexane on a nylon 6,6 ultrafiltration membrane. This membrane gave an oil rejection of approximately 96 vol % at a flux of approximately 600 $\lambda/m^2day$ for the separation of NMP from extract oil at 70° C. and a feed pressure of 500 PSIG.

Both the concentration of the diamine and the acid chloride are important in controlling the performance of the membrane.

TABLE 2

| PERFORMANCE OF POLYETHYLENIMINE/ METHYLENE DIISOCYANATE MEMBRANES | |
|---|---|
| Feed = | 13 vol % 150N extract oil/NMP |
| Temperature = | 70° C. |
| Pressure = | 500 PSIG |
| Membrane = | methylene diisocyanate in 35/15 toluene/hexane reacted with polyethylenimine in water on a 0.04μ nylon membrane |

TABLE 2-continued
PERFORMANCE OF POLYETHYLENIMINE/ METHYLENE DIISOCYANATE MEMBRANES

| Wt % MDI | Wt % PEI | Flux (1/m² day) | Oil Rejection (vol. %) |
|---|---|---|---|
| 0.25 | 0.25 | 221 | 94.6 |
|  | 0.50 | 128 | 96.1 |
|  | 0.67 | 143 | 97.6 |
|  | 1.0 | 103 | 98.5 |
| 0.5 | 0.25 | 497 | 92.3 |
|  | 0.50 | 223 | 96.2 |
|  | 0.67 | 112 | — |
|  | 1.0 | 94 | 99.0 |
| 0.6 | 0.25 | 323 | 90.0 |
| 0.5(a) | 1.0 | 50 | 99.0 |
| 0.5(a) | 0.25 | 197 | 99.0 |

(a) MDI dissolved in toluene

TABLE 3
PERFORMANCE OF POLYETHYLENIMINE/TOLUENE DIISOCYANATE MEMBRANES

| Feed = | 13 vol % 150N extract oil/NMP |
|---|---|
| Temperature = | 70° C. |
| Pressure = | 500 PSIG |
| Membrane = | toluene diisocyanate in hexane reacted with polyethylenimine in water on a 0.04μ nylon membrane |

| Wt % TDI | Wt % PEI | Flux (1/m² day) | Oil Rejection (vol %) |
|---|---|---|---|
| 0.25 | 0.25 | 411 | 90.8 |
|  | 0.5 | 76 | 98.5 |
|  | 1.0 | 10 | 98.0 |
| 0.50 | 0.25 | 280 | 92.3 |
|  | 0.50 | 60 | 99.0 |
|  | 1.0 | 45 | 99.0 |

TABLE 4
PERFORMANCE OF POLYETHYLENIMINE/ ISOPHTHALOYL DICHLORIDE MEMBRANES

| Feed = | 13 vol % 150N extract oil/NMP |
|---|---|
| Temperature = | 70° C. |
| Pressure = | 500 PSIG |
| Membrane = | isophthaloyl dichloride in hexane reacted with polyethylenimine in water on a 0.04μ nylon membrane |

| Wt % IPC | Wt % PEI | Flux (1/m² day) | Oil Rejection (vol. %) |
|---|---|---|---|
| 0.5 | 0.67 | 294 | 78.5 |
| 1.0 | 1.0 | 123 | 76.9 |

TABLE 5
PERFORMANCE OF 1,4-PHENYLENE DIAMINE/ TRIMESOYL CHLORIDE MEMBRANES

| Feed = | 13 vol % MCT 10 extract oil/NMP |
|---|---|
| Temperature = | 70° C. |
| Pressure = | 500 PSIG |
| Membrane = | trimesoyl chloride in hexane reacted with 1,4 phenylene diamine in water on a 0.04μ nylon membrane |

| Wt % 1,4-PDA | Wt % TMC | Flux (1/m² day) | Oil Rejection (vol. %) |
|---|---|---|---|
| 1.0 | 0.15 | 1050 | 87.7 |
|  | 0.38 | 1270 | 58.5 |
|  | 0.50 | 1470 | 70.8 |
| 2.0 | 0.50 | 1100 | 81.4 |
| 4.0 | 0.15 | 802 | 96.9 |
| 4.0 | 0.15 | 580 | 95.4 |
| 4.0 | 0.5 | 615 | 90.8 |

1,4-PDA = 1,4 phenylene diamine
TMC = trimesoyl chloride

TABLE 6
PERFORMANCE OF 1,3-PHENYLENE DIAMINE/ TRIMESOYL CHLORIDE MEMBRANES

| Feed = | 13 vol % extract oil/NMP |
|---|---|
| Temperature = | 70° C. |
| Pressure = | 500 PSIG |
| Membrane = | trimesoyl chloride in hexane reacted with 1,3-phenylene diamine in water on a 0.04μ nylon membrane |

| Wt % 1,3-PDA | Wt % TMC | Flux (1/m² day) | Oil Rejection (vol. %) |
|---|---|---|---|
| 4 | 0.15 | 1050 | 70 |

EXAMPLE 3

Membranes were prepared in a continuous manner on an interfacial polymerization machine using nylon 6,6 membrane with 0.04μ pore size obtained from Pall Ultrafine Filtration Corporation as support. Solutions were prepared of 4% 1,4-phenylene diamine in water and 0.14% trimesoyl chloride in Chevron 350B.

The membranes were prepared in a continuous manner on an interfacial polymerization machine. The nylon membrane support was moved through the machine by means of rollers at a web speed of 3 feet per minute. The nylon membrane first contacted a trough containing the amine solution at 40° C., was then allowed to partially dry as it travelled by rollers to a second trough where it contacted the trimesoyl chloride solution at room temperature. The membrane then travelled through an oven where it was heated at 125° F. for 5 minutes.

The contact time of the nylon membranes with the reactant solutions and the time of evaporation between contacting the amine solution and the trimesoyl chloride solution were different from laboratory conditions due to the physical constraints of the IFP machine. The contact time in the amine solution was 18 seconds (versus 1 minute in the laboratory). The evaporation period between the solutions was 3 minutes and 25 seconds (versus 1 minute in the laboratory). The contact time in the trimesoyl chloride solution was 12 seconds (versus 1 minute in the laboratory). The following results were obtained from 4 different runs on the IFP machine. Membrane performance was determined by circulating a sample of an extract oil solution (average molecular weight of oil=400 g/mole) containing 14 vol % oil in NMP over the membrane at 70° C. at an applied feed pressure of 500 PSIG. The permeate yield was kept below 5% to ensure that the feed composition did not change during testing. The membrane flux was recorded and permeate samples collected. The volume percent oil in both the feed and permeate samples was measured.

| Membrane | Flux 1/m² day | Oil Rejection vol % |
|---|---|---|
| A | 413 | 90 |
| B | 500 | 93 |
| C | 475 | 90 |
| D | 650 | 71 |

The membrane flux observed was comparable to the laboratory prepared membranes but the oil rejection was somewhat erratic and lower than the laboratory results. These results were attributed to the following. The nylon 6,6 membrane is very hydrophobic. It does not become completely saturated with the aqueous amine solution during the 18 seconds of contact. The aqueous solution then wicks into the interior of the nylon membrane during the evaporation period. The short contact time with the trimesoyl chloride solution may not have been sufficient for adequate contact with the PDA solution in the interior of the membrane leading to defects in the membrane.

These membranes were also observed to contain crystals of PDA as a result of using a saturated aqueous solution of PDA. The adhesive used for element manufacture exhibited very poor bonds with these membranes containing crystals and hence these membranes were unacceptable.

EXAMPLE 4

An effort was made to reduce the crystals in the membranes by reducing the concentration of the amine solution keeping other factors constant. The following results were obtained on testing these membranes using the same test conditions as before.

| Membrane | % 1,4-PDA | Flux $1/m^2$ day | Oil Rejection vol % |
|---|---|---|---|
| E | 3.5 | 525 | 86 |
| F | 2.0 | 400 | 71 |

As the 1,4-PDA concentration decreased to 2.0%, the oil rejection decreased to 71 vol. %. In contrast, a laboratory sample made with an even lower concentration of 1, 4 PDA of 1% showed an oil rejection of 87.7%. (See Table 5) The poor result of the machine produced membranes can be attributed to the very short contact times in the reactant baths. It is known in the prior art that longer contact times can increase the extent of reaction occurring between the two reactants (U.S. Pat. No. 3,951,815). The contact time between the reactants was increased to approximately that of the laboratory study.

The web speed on the IFP machine was changed to 1 foot per minute. This increased the contact time in the amine solution to 50 seconds, the in-between evaporation period to 10 minutes and 25 seconds, and the contact time in the trimesoyl chloride solution to 45 seconds. Backside wetting of the nylon membrane in the amine solution plus the longer contact time ensured that the nylon membrane was saturated with the amine solution and that adequate reaction occurred in the trimesoyl chloride bath. Membranes were prepared with varying amine concentrations and were reacted with a 0.25% trimesoyl chloride solution. Using the same test procedure as before, the following results were attained.

| Membrane | % 1,4-PDA | Flux $1/m^2$ day | Oil Rejection vol % |
|---|---|---|---|
| G | 2.0 | 350 | 96 |
| H | 2.0 | 315 | 96 |
| I | 1.2 | 340 | 96 |
| J | 0.6 | 400 | 92 |
| K | 0.3 | 325 | 88 |

Down to an amine concentration of 1.2%, membranes with 96 vol % oil rejection were obtained. These membranes contained no crystals and exhibited strong bonds with the adhesive used for element preparation.

What is claimed is:

1. A method for separating aromatic extraction solvents selected from the group consisting of n-methyl 2-pyrrolidone (NMP), phenol, sulfolane, dimethyl formamide (DMF), dimethylsulfoxide (DMSO), and dimethylacetamide (DMAc) from mixtures comprising said aromatic extraction solvents and oil, said method comprising contacting the aromatic extraction solvent and oil mixture with an interfacially polymerized crosslinked membrane on microporous organic solvent resistant ultrafiltration backing under reverse osmosis conditions and recovering the aromatic extraction solvent as permeate, said interfacially polymerized membrane comprising the reaction product of a multifunctional polyimine compound dissolved in water with a polyfunctional agent dissolved in an organic solvent, at least one of which reactants is trifunctional, on a backing.

2. The method of claim 1, wherein the multi-functional polyimine reactant is polyethyleneimine.

3. The method of claim 1 wherein the polyfunctional agent is selected from di- and tri-acid halides, acid anhydrides, aliphatic diisocyanates, aromatic diisocyanates, thioisocyantes, haloformates, sulfonylhalides and mixtures thereof.

4. The method of claims 1, 2 or 3 wherein the multifunctional polyimine compound in water is at a concentration of 0.1 to 10 wt %, and the polyfunctional agent reactant in organic solvent is at a concentration of 0.1 to 5 wt %.

5. The method of claim 4 wherein the backing is selected from nylon, cellulose, polyester, teflon, polypropylene, polyethylene, polyethylene terephthalate ultrafiltration membranes.

6. The method of claim 5 wherein the ultrafiltration membrane support layer has pores in the range of 0.02 to $0.1\mu$.

7. The method of 1, 2 or 3 wherein the backing is selected from nylon, cellulose, polyester, teflon, polypropylene, polyethylene, polyethylene terephthalate ultrafiltration membranes.

8. The method of claim 7 wherein the ultrafiltration membrane support layer has pores in the range of 0.02 to $0.1\mu$.

9. A method for separating organic solvents and organic solutes from mixtures thereof comprising contacting the organic solvent/organic solute mixture with an interfacially polymerized crosslinked membrane on microporous organic solvent resistant ultrafiltration backing under reverse osmosis conditions and recovering said organic solvent, said interfacially polymerized membrane comprising the reaction product of a multifunctional polyamine compound dissolved in water with a polyfunctional agent dissolved in an organic solvent, at least one of which reactants is trifunctional, on a backing.

10. The method of claim 9 wherein the multi-functional polyamine reactant is selected from polyvinylamine, polyvinylaniline, polybenzylamine, amine modified polyepihalohydrines, m-phenylenediamine, p-phenylene diamine, triaminobenzine, cyclohexane diamine, cycloheptane diamine, piperidine, 2,4-bis (2-aminobenyl) aniline, polyvinylimidazoline.

11. The method of claim 9 wherein the polyfunctional agent is selected from di- and tri-acid halides, acid anhydrides, aliphatic diisocyanates, aromatic diisocyanates, thioisocyanates, haloformates, sulfonylhalides and mixtures thereof.

12. The method of claim 9 wherein the multi-functional polyamine compound in water is at a concentration of 0.1 to 10 wt. %, and the polyfunctional agent reactant in organic solvent is at a concentration of 0.1 to 5 wt. %.

13. The method of claim 9, 10, 11 or 12 wherein the backing is selected from nylon, cellulose, polyester, teflon, polypropylene, polyethylene, polyethylene terephthalate ultrafiltration membranes.

14. The method of claim 13 wherein the ultrafiltration membrane support layer has pores in the range of 0.02 to 0.1µ.

15. The method of claim 9, 10, 11 or 12 wherein the organic solvent/organic solute mixture which is separated is a mixture of aromatic extraction solvent and oil.

16. The method of claim 15 wherein the aromatic extraction solvent is selected from N-methylpyrrolidine (NMP), phenol, sulfolane, furfural, N,N-dimethylformamide (DMF), dimethyl sulfoxide (DMSO), and dimethyl acetamide (DMAc).

17. The method of claim 9, 10, 11 or 12 wherein the organic solvent/organic solute mixture is separated is a mixture of dewaxing solvents selected from the group consisting of ketones and mixtures of ketones and aromatic hydrocarbons and dewaxed oil.

18. The method of claim 17 wherein the dewaxing solvent is selected from methylethylketone (MEK), methylisobutyl ketone (MIBK), mixtures of methylethylketone and methylisobutyl ketone, and mixtures of methylethylketone and toluene.

19. A method for separating N-methyl-2-pyrrolidone (NMP) from mixtures comprising said NMP and oil, said method comprising contacting the NMP and oil mixture with an interfacially polymerized crosslinked membrane on microporous organic solvent resistant ultrafiltration backing under reverse osmosis conditions and recovering the NMP as permeate, said interfacially polymerized membrane comprising the reaction product of a multi-functional polyimine compound dissolved in water with a polyfunctional agent dissolved in an organic solvent, at least one of which reactants is trifunctional, on a backing.

20. The method of claim 19 wherein the multi-functional polyimine reactant is selected from polyethyleneimine.

21. The method of claim 19 wherein the polyfunctional agent is selected from di- and tri-acid halides, aliphatic diisocyanate, aromatic diisocyanate, thioisocyanate, acid anhydrides, haloformates, sulfonylhalides and mixtures thereof.

22. The method of claim 19, 20 or 21 wherein the multi-functional polyimine compound in water is at a concentration of 0.1 to 10 wt. % and the polyfunctional agent reactant in organic solvent is at a concentration of 0.1 to 5 wt. %.

23. The method of claim 22 wherein the backing is selected from nylon, cellulose, polyester, teflon, polypropylene, polyethylene, polyethylene terephthalate ultrafiltration membranes.

24. The method of claim 23 wherein the ultrafiltration support membrane has pores in the range of 0.02 to 0.1µ.

25. The method of claim 19, 20 or 21 wherein the backing is selected from nylon, cellulose, polyester, teflon, polypropylene, polyethylene, polyethylene terephthalate ultrafiltration membranes.

26. The method of claim 25 wherein the ultrafiltration membrane support layer has pores in the range of 0.02 to 0.1µ.

* * * * *